(12) United States Patent
Kotowski et al.

(10) Patent No.: US 10,567,853 B2
(45) Date of Patent: Feb. 18, 2020

(54) SMART GRID APPLIANCE CONTROL

(71) Applicant: Atmel Corporation, San Jose, CA (US)

(72) Inventors: Jeff Kotowski, Nevada City, CA (US); Charles Cai, Mather, CA (US)

(73) Assignee: Amtel Corporation, San Jose, CA (US)

( * ) Notice: Subject to any disclaimer, the term of this patent is extended or adjusted under 35 U.S.C. 154(b) by 0 days.

(21) Appl. No.: 15/881,178

(22) Filed: Jan. 26, 2018

(65) Prior Publication Data

US 2018/0152769 A1    May 31, 2018

Related U.S. Application Data

(63) Continuation of application No. 13/967,176, filed on Aug. 14, 2013, now Pat. No. 9,883,257.

(51) Int. Cl.
*H04Q 9/00* (2006.01)
*G08C 17/00* (2006.01)
*G01D 4/00* (2006.01)

(52) U.S. Cl.
CPC .............. *H04Q 9/00* (2013.01); *G08C 17/00* (2013.01); *G01D 4/00* (2013.01); *Y02B 90/241* (2013.01); *Y02B 90/244* (2013.01); *Y02B 90/245* (2013.01); *Y04S 20/32* (2013.01); *Y04S 20/327* (2013.01); *Y04S 20/40* (2013.01); *Y10T 307/406* (2015.04); *Y10T 307/832* (2015.04)

(58) Field of Classification Search
CPC .... Y10T 307/832; Y10T 307/406; G01D 4/00
See application file for complete search history.

(56) References Cited

U.S. PATENT DOCUMENTS

| 7,043,380 | B2 * | 5/2006 | Rodenberg, III | G01D 4/006 340/12.32 |
| 7,257,466 | B2 * | 8/2007 | Kreiner | H02H 11/00 174/480 |
| 8,260,471 | B2 * | 9/2012 | Storch | G06Q 10/06 700/295 |
| 8,285,422 | B2 * | 10/2012 | Nagao | G06F 1/266 700/286 |
| 8,295,990 | B2 * | 10/2012 | Venkatakrishnan | G06Q 50/06 700/296 |

(Continued)

*Primary Examiner* — Jared Fureman
*Assistant Examiner* — Emmanuel Dominique
(74) *Attorney, Agent, or Firm* — Fish & Richardson P.C.

(57) ABSTRACT

Systems and methods for controlling small grids of appliances are described. One sample method includes receiving consumption data from a plurality of electrical appliances that are plugged into outlets at a first location and monitoring power usage at the first location. The method includes evaluating the received consumption data to identify one or more predetermined conditions in one or more of the plurality of electrical appliances and evaluating stored data related to power consumption preferences at the first location. The power consumption preferences define conditions when a consumer associated with the first location has agreed to enable remote control of at least one designated appliance upon an occurrence of one or more predetermined conditions. The method includes determining that the one or more conditions are satisfied and to provide a first secure communication to the first appliance to control the power consumption.

22 Claims, 5 Drawing Sheets

(56) References Cited

U.S. PATENT DOCUMENTS

| | | | |
|---|---|---|---|
| 8,355,826 B2 * | 1/2013 | Watson | G06Q 50/06 700/291 |
| 9,883,257 B2 | 1/2018 | Kotowski et al. | |
| 2001/0036273 A1 * | 11/2001 | Yoshizawa | H04L 63/083 380/247 |
| 2004/0201931 A1 * | 10/2004 | Korcharz | H02J 1/10 361/18 |
| 2004/0254654 A1 * | 12/2004 | Donnelly | H02J 3/14 700/22 |
| 2007/0255460 A1 * | 11/2007 | Lopata | H02J 3/14 700/293 |
| 2007/0276548 A1 * | 11/2007 | Uzunovic | G06F 1/266 700/297 |
| 2008/0092239 A1 * | 4/2008 | Sitrick | G06F 21/10 726/27 |
| 2008/0188963 A1 * | 8/2008 | McCoy | G06F 9/54 700/90 |
| 2010/0177450 A1 * | 7/2010 | Holcomb | H02H 9/023 361/19 |
| 2011/0184581 A1 * | 7/2011 | Storch | G06Q 10/06 700/295 |
| 2011/0238988 A1 * | 9/2011 | Tanaka | H04L 9/32 713/168 |
| 2012/0050971 A1 | 3/2012 | Seal et al. | |
| 2012/0053739 A1 * | 3/2012 | Brian | G06F 1/3203 700/287 |
| 2012/0109395 A1 * | 5/2012 | Finch | G06Q 50/06 700/295 |
| 2013/0245849 A1 * | 9/2013 | Paul | H02J 3/14 700/295 |
| 2013/0320776 A1 * | 12/2013 | Cook | H02J 13/002 307/126 |
| 2014/0088780 A1 * | 3/2014 | Chen | G05F 1/66 700/295 |
| 2014/0340075 A1 * | 11/2014 | Doi | G01D 4/002 324/113 |
| 2015/0013001 A1 * | 1/2015 | Lee | H04L 63/0823 726/15 |
| 2015/0055779 A1 * | 2/2015 | Enomoto | G08C 17/00 380/270 |

* cited by examiner

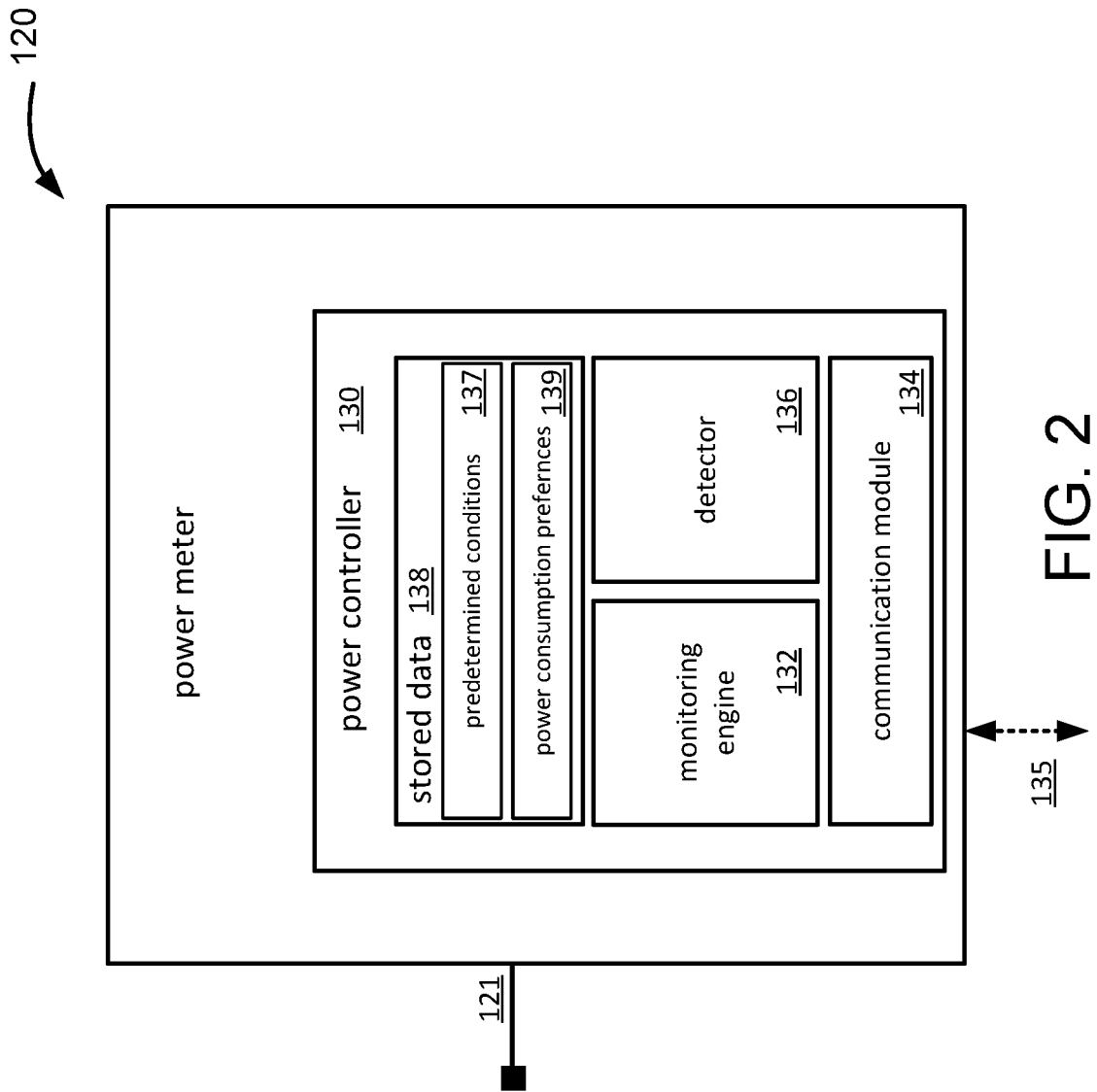

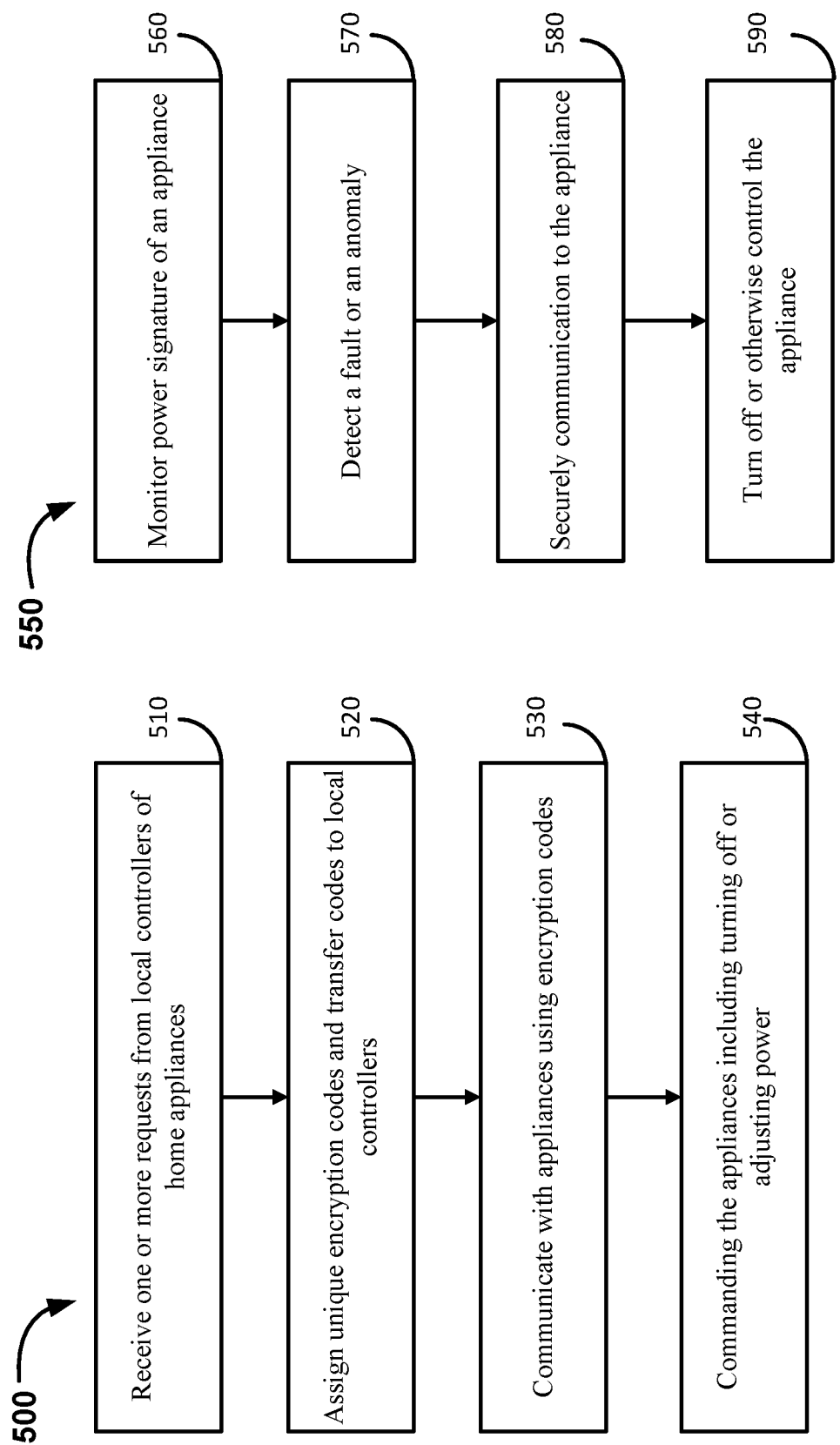

SMART GRID APPLIANCE CONTROL

CLAIM OF PRIORITY

This application is a continuation application and claims priority to U.S. patent application Ser. No. 13/967,176, filed on Aug. 14, 2013, the entire contents of which are hereby incorporated by reference.

TECHNICAL FIELD

This disclosure relates generally to electronics including controllers.

BACKGROUND

Devices coupled to a power outlet or directly wired into a power grid can vary their consumption over time. When powered off, the consumption can be small or zero depending on the device. When powered on and operating properly, the power consumption can vary according to use and other factors (heat, age, etc.). When operating defectively, power consumption can be large, unpredictable and potentially dangerous. Each device typically operates in a vacuum, that is as a standalone unit that is neither monitored nor controlled remotely.

SUMMARY

In one aspect, a method includes receiving consumption data from a plurality of electrical appliances that are plugged into outlets at a first location; monitoring power usage at the first location including evaluating the received consumption data to identify one or more predetermined conditions in one or more of the plurality of electrical appliances; evaluating stored data related to power consumption preferences at the first location, the power consumption preferences defining conditions when a consumer associated with the first location has agreed to enable remote control of at least one designated appliance of the plurality of electrical appliances upon an occurrence of one or more predetermined conditions; determining that the one or more conditions are satisfied based at least in part on the monitoring of the received consumption data for a first appliance of the at least one designated appliances; and providing a first secure communication to the first appliance to control power consumption based at least in part on the determining.

In another aspect, a method includes plugging an appliance into a power grid at a location; after plugging in, automatically configuring the appliance to communicate with a power controller including establishing a secure communication link with the power controller over lines used to power the appliance or over airwaves using a wireless communication link; receiving a command from the power controller over the secure communication link to change an operation mode or a power configuration of the appliance in response to an occurrence of a predetermined set of conditions that relate to power consumption of the appliance; and changing the operation mode or power configuration of the appliance in response to the received command.

In another aspect, a system includes a power controller that is configured to be coupled to a power grid at a first location, wherein the first location includes a plurality of appliances coupled to the power grid. The power controller includes an input interface that receives consumption data from a plurality of electrical appliances that are plugged into outlets at the first location, a monitoring engine that monitors power usage at the first location including evaluating the received consumption data to identify one or more predetermined conditions in one or more of the plurality of electrical appliances, and a data set of stored data related to power consumption preferences associated with appliances at the first location.

The power consumption preferences define conditions where a consumer associated with the first location has agreed to enable the remote control of at least one designated appliance of the plurality of electrical appliances upon an occurrence of one or more predetermined conditions. The power controller also includes a detector that determines that the one or more predetermined conditions are satisfied based at least in part on the received consumption data for a first appliance of the at least one designated appliance of the plurality of electrical appliances, and a security device that provides a first secure communication to the first appliance to control power consumption based at least in part on the determination.

The system also includes one or more local controllers coupled to or integrated with respective ones of the plurality of electrical appliances that receive the first secure communication and act to adjust the power consumption in response thereto; and a first network that couples the one or more local controllers to the power controller.

Implementations may include one or more of the following features. The consumption data may include one or more of an input voltage of AC power to, a current drawn by, a power used by, a power factor associated with, an integral power for, or a power state of a respective appliance. Receiving the consumption data may include receiving consumption data through a power grid associated with the first location and may include receiving consumption data using a first network that couples the plurality of electrical appliances to a device that provides the first secure communication.

The determination may include monitoring a power signature of the first appliance and detecting an anomaly, and providing the first secure communication may further include providing a command to turn the first appliance off responsive thereto. The determination may include detecting a fault in the first appliance, and providing a first secure communication may further include providing a command to turn the first appliance off responsive thereto.

Providing the first secure communication may include receiving one or more requests including unique identification numbers from local controllers associated with respective appliances to join a first network of appliances; assigning unique encryption codes corresponding to the unique identification numbers to the respective appliances; transferring the encryption codes to the respective local controllers of the appliances; and communicating with one or more appliances using the encryption codes. The first secure communication may include a command to perform one or more of turning the first appliance off or adjusting a power usage of the first appliance.

One or more of the evaluating, determining or providing may be performed by a system associated with a power provider entity and may not be locally performed at the first location. A second secure communication may be provided to one or more authorized users using a second network and authorized users may receive the consumption data and may send commands to control power consumption.

A local controller associated with the first appliance may be integrated into a plug on a power cord associated with the first appliance. A local controller associated with the first appliance may be plugged into the power grid at a first receptacle and the first appliance may be plugged into the local controller. A local controller may have a power sensor that is included in a plug of the appliance. A local controller may provide a second means for adjusting power consumption of a respective appliance, and wherein the first means may be included in the respective appliance.

The power sensor may measure one or more electrical parameters of the appliance including a voltage, a current, a power factor, or a power usage, and the local controller of the appliance may receive the measured parameters. The predetermined conditions may be specified by the consumer. The first network can be the power grid. The first network may be external to the power grid.

The power controller may be configured to adjust a power consumption of a respective appliance in coordination with a respective local controller and may communicate a command using a first secure communication mechanism to adjust power consumption. The respective local controller may receive consumption limits at startup of the respective appliance and may control consumption in response thereto. The power controller may receive data from one or more appliances including current, voltage, power factor, power state, or power usage of the appliances.

The local controllers may include or may be assigned unique identification numbers and the unique identification numbers may be used for the first secure communication. A second network may be coupled to the power controller, the second network may provide a second secure communication between the power controller and one or more authorized users and the authorized users may receive the consumption data and may send commands to the power controller.

Aspects of the invention may implement none, one or more of the following advantages. Proposed systems and methods can be used to control a household grid of home appliances coupled to a power meter. The power meter and the home appliances may be coupled through a secure communication network and the power meter may receive consumption data of the home appliances and may control the power consumption of the home appliances.

The details of one or more implementations are set forth in the accompanying drawings and the description below. Other aspects, features, and advantages will be apparent from the description and drawings, and from the claims.

BRIEF DESCRIPTION OF THE DRAWINGS

FIG. 2 is a diagram of an example power controller.

FIG. 5A is a flow diagram of an example method for establishing secure communication.

FIG. 5B is a flow diagram of an example method for responding to fault or anomaly.

DETAILED DESCRIPTION

Large power consumers may help a power distribution company reduce the demand at peak hours by allowing the power distribution company to turn off some of their large loads during the hours of peak demand. While this is helpful, a significant portion of power consumed during some peak periods is due to the multitude of small appliances in average households that are coupled to a respective power grid. Control of these small appliance groupings in a household could present opportunities for additional savings for both the power distribution company and consumers.

Figure 1:
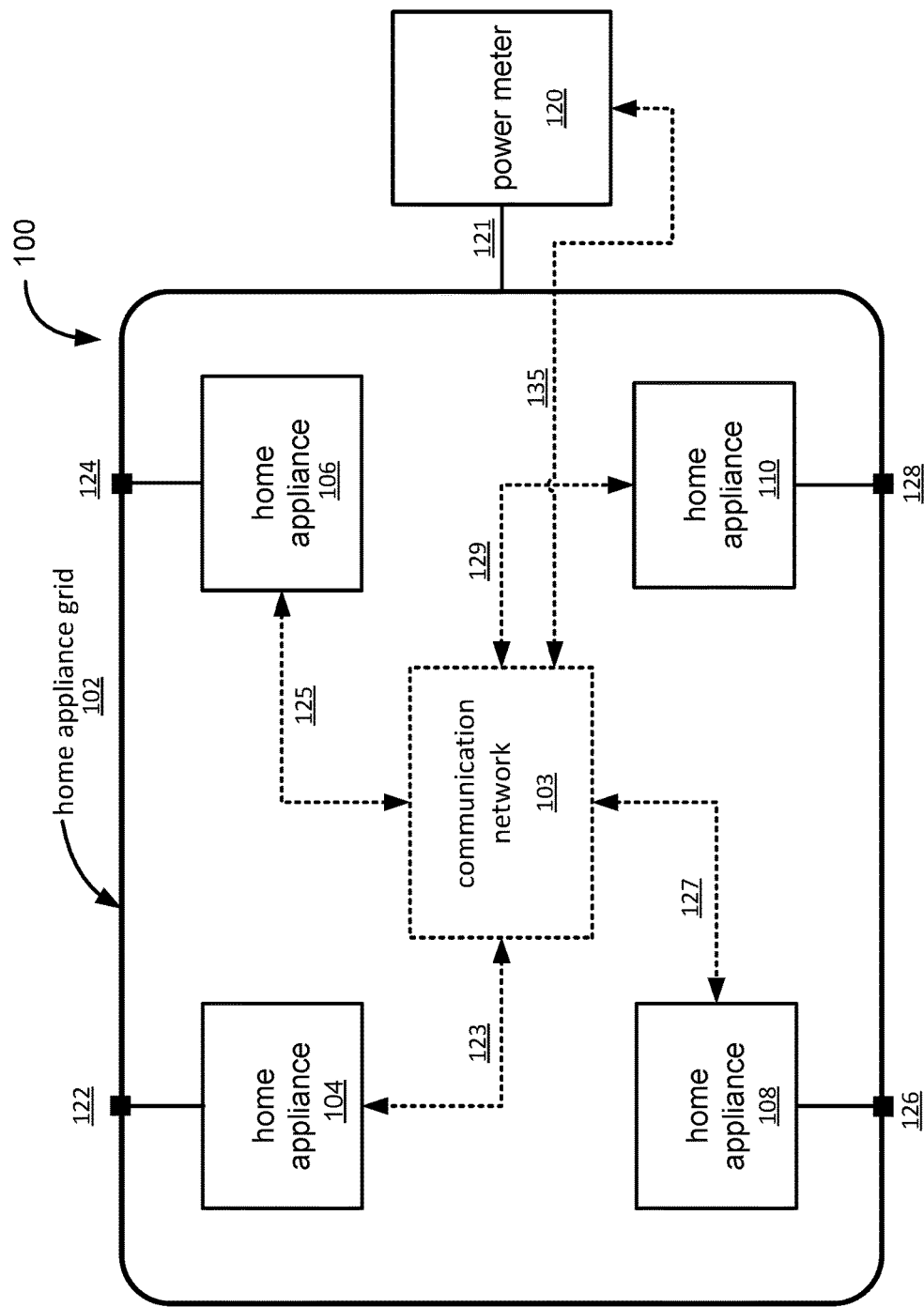
FIG. 1 is a circuit diagram of an example household grid of appliances.

Referring to FIG. 1, an example of a circuit 100 is shown that includes a home appliance grid 102. One or more home appliances 104, 106, 108, or 110 may be coupled to the home appliance grid 102 and the coupling can be through power plugs 122, 124, 126, or 128. A home appliance such as one of home appliance 104, 106, 108, or 110 is described in greater detail below with respect to FIG. 3A.

A power meter 120 may be coupled to the home appliance grid 102 through a power cord 121. The home appliance grid 102 can be a power grid that can provide power to the home appliances 104, 106, 108, or 110. The power meter 120 is described in greater detail below with respect to FIG. 2.

A secure communication network 103 may couple the home appliances 104, 106, 108, or 110 to the power meter 120. The power meter 120 can be coupled and may communicate to the secure communication network 103 through a secure communication connection 135. The home appliances 104, 106, 108, or 110 may couple and may communicate to the secure communication network 103 through respective secure communication connections 123, 125, 127, or 129.

Through the secure communication network 103, the power meter 120 may receive consumption data from the home appliances 104, 106, 108, or 110 and may monitor the power usage of the home appliances 104, 106, 108, or 110. The power meter 120 may control power consumption of one or more home appliance 104, 106, 108, or 110 including providing one or more control commands for commanding the home appliances using the secure communication network 103.

In some implementations, the home appliance grid 102 may be used as the secure communication network 103 and the power cords 122, 124, 126, or 128 may provide the secure communication connection for the home appliances 104, 106, 108, or 110 to communicate to the secure communication network 103. In this example configuration, the power cord 121 may provide a secure communication connection between the power meter 120 and the secure communication network 103.

Referring to FIG. 2, an example of a power meter 120 for distributing power to home appliances and for monitoring and controlling home appliances 104, 106, 108, or 110 is shown. The power meter 120 may include a power controller 130. Power controller 130 may include a monitoring engine 132, a communication module 134, and a detector 136. The power meter 120 may be coupled to the secure communication network 103 through the secure communication connection 135 and may receive the home appliances consumption data through the secure communication connection 135.

The power controller 130 may include stored data 138. The stored data 138 may include predetermined conditions 137 and power consumption preferences 139 associated with the home appliances which may be coupled to the home appliance grid 102. For example, the stored data 138 can include power consumption preferences 139 and predetermined conditions 137 for each of the home appliances 104, 106, 108, or 110.

The power consumption preferences 139 may include maximum consumption data associated with each of the home appliances 104, 106, 108, or 110 and may define different states of operation of a respective home appliance.

In some implementations, the different states of operation for a given home appliance may include peak demand (e.g., at any given time), timed demand (i.e., acceptable demand over a predetermined time period) and/or ambient demand (i.e., steady state demand when the device is not in use or is in a reduced power mode). The demand may be described in terms of limitations on electric power or electric current usage for the home appliance in each of its respective states of operation.

The predetermined conditions 137 define times or states when the power controller 130 is authorized to control the one or more home appliances 104, 106, 108 or 110. In some implementations, a user associated with a home network that couples the home appliances 104, 106, 108 and 110 may review and approve the predetermined conditions.

The monitoring engine 132 may receive consumption data of home appliances 104, 106, 108, or 110, evaluate the received consumption data. One or more alarms may result based on the monitoring. For example, the monitoring engine 132 may monitor an overall demand of all of the appliances that are included at a first location. With respect to an individual appliance, monitoring engine 132 can be configured to monitor demand over a given time period and report the same to the detector 136. The output of the monitoring engine is monitored data. In some implementations, the monitor engine 132 evaluates the received consumption data to identify one or more predetermined conditions in one or more of the plurality of electrical appliances and the output includes an indication of the existence of a given condition.

The detector 136 may receive the monitored data and evaluate demand for a given appliance to determine when a set of predetermined conditions that triggers control of an appliance have been met. More specifically, the monitoring engine 132 can evaluate the power consumption preferences 139 and determine when the one or more conditions associated with one or more home appliances 104, 106, 108, or 110 are satisfied. Based on the determination, the power controller 130 may control the power consumption of home appliance(s) as will be described in greater detail below. The power controller 130 may control one or more of the home appliances 104, 106, 108, or 110 through the communication module 134. While reference is made to both a separate monitoring engine and a detector, in some implementations, the functionality described can be combined into a single engine or module. The communication module 134 may provide a secure communication through the secure communication connection 135 and the secure communication network 103 to the one or more home appliances 104, 106, 108, or 110 and based on the determination of the detector 136, may control the power consumption of the home appliance(s).

As described above, in some implementations, the predetermined conditions 137 may include a maximum power or a maximum current consumption. In some implementations, the detector 136 may evaluate the conditions and control one or more home appliances depending on the specific conditions presented. Conditions and power consumption, of course, can change over time and use of a given appliance. Further, a failure in a given device can occur over its operational life. Even when a device fails or exceeds certain demand, such a condition may still not warrant giving up/exercising control over the device. Other conditions may have to be satisfied. For example, time of day conditions may be specified by the user for when control may be exercised. For example, a user may wish to inhibit control during daytime hours but enable control during night time hours. Other examples are possible. That is, the detector's decision to exercise control may not be based purely on demand (e.g., as indicated by the monitored data), but rather on other factors (e.g., when demand occurs, state of a device, length of an occurrence). All of these conditions can be defined in the power consumption preferences 139. The conditions define different parameters for different devices and different operating modes (e.g., during peak mode, low power or off-line mode and/or different times of day). In some implementations, the power consumption preferences 139 can be agreed to between a consumer associated with the home appliance grid 102 and a power distribution company.

In some implementations, the predetermined conditions 137 may include power consumption limits associated with normal operation of the home appliances. By comparing the consumption data with the data associated with normal operation data of the home appliances, detector 136 may detect a fault or anomaly in the power consumption of the home appliances.

In some implementations, the power controller 130 may not be included in the power meter 120 and the power controller 130 can be a separate module from the power meter 120. In some implementations, the power controller 130 may initiate controlling home appliances. In some implementations, the power controller 130 may receive a command to control one or more home appliances.

In some implementations, the power controller 130 may be coupled to a second secure communication network and the power controller 130 may receive new or updated predetermined conditions and/or new or updated power consumption preferences. In some implementations, the power controller 130 may be coupled to a second secure communication network and the power controller 130 may receive commands for controlling the home appliances.

Figure 3A:
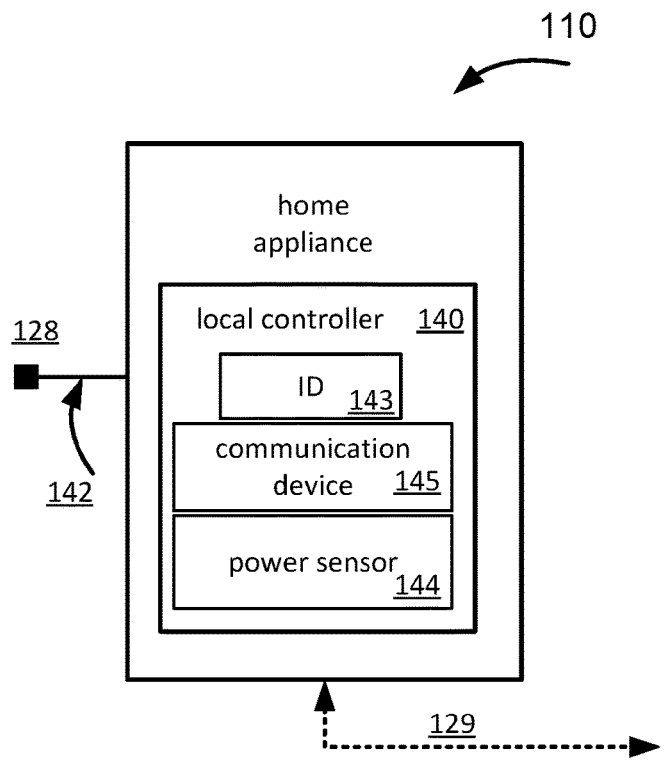
FIG. 3A is a diagram of an example home appliance.

Referring to FIG. 3A, an example home appliance 110 is shown. The home appliance 110 includes a local controller 140 and a power cord 142. The home appliance 110 can be coupled to a home appliance grid 102 through the power cord 142 and the plug 128. The local controller 140 may include an ID module 143 for holding a unique identification number.

The local controller 140 includes a communication device 145 that can be coupled to the secure communication network 103 through the secure communication connection 129. The communication device 145 can securely communicate with the power controller 130 and may securely send power consumption data to the power controller 130 or receive command(s) and/or data from the power controller 130.

The local controller 140 includes a power sensor 144. The power sensor 144 can measure the power consumption of the appliance 110 and may supply the power consumption data to the local controller 140. The local controller 140 may use the secure communication connection 129 and provide the power consumption data of the appliance 110 to the power controller 130.

In some implementations, the power sensor 144 may measure one or more electrical parameters of the appliance including a voltage, a current, a power factor, or a power usage, and may provide the measured electrical parameters to the local controller 140 of the home appliance and the local controller 140 may calculate the power consumption data.

In some implementations, the local controller 140 may use the communication device 145 and send the electrical parameters to the power controller 130 and the power meter 130 may calculate the power consumption data of the example appliance 110. In some implementations, the consumption data of an appliance may include one or more electrical parameters of the appliance including a voltage, a current, a power factor, or a power usage.

In some implementations, the power controller 130 may send a command to the local controller 140 to turn off or adjust the operation of the home appliance. In some implementations, the power controller 130 may send a command to the local controller 140 to adjust the power usage of the home appliance. In some implementations, the local controller 140 may receive consumption limits of the respective home appliance at each startup (e.g., turn on) and the local controller 140 may control power consumption of the respective home appliance based on the received consumption limits.

Figure 3B:
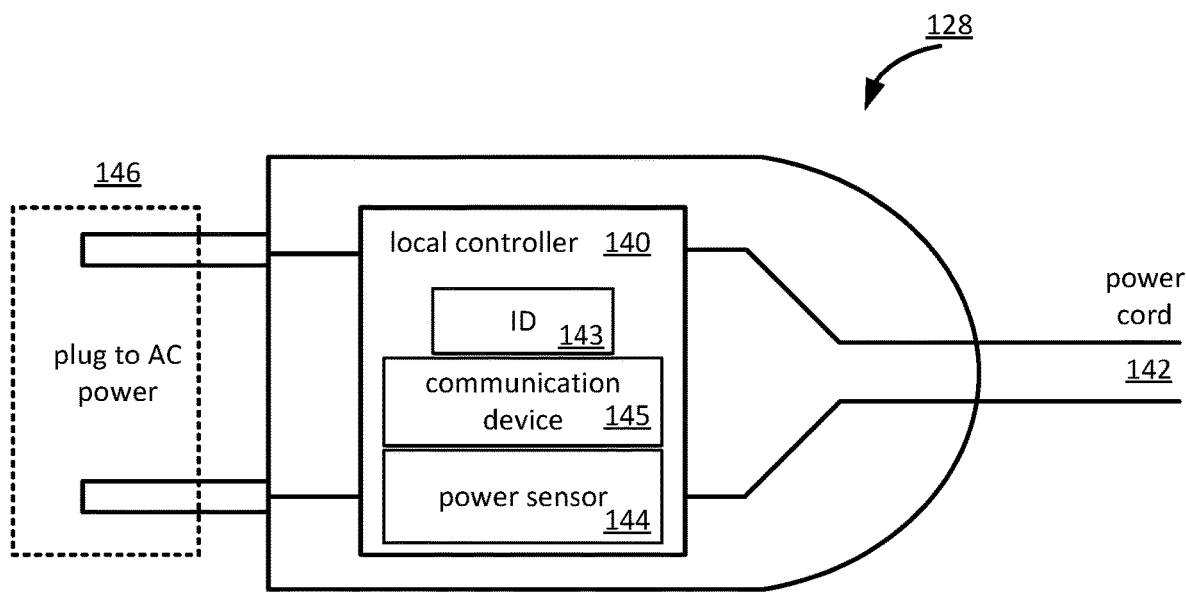
FIG. 3B is a diagram of an example power cord of a home appliance.

Referring to FIG. 3B, an example plug 128 is shown. The plug 128 may be coupled to a home appliance (e.g., 110) from a first end through the power cord 142 and to a socket of the home appliance grid 102 from a second end 146. The plug 128 may include a local controller 140. An example of the local controller 140 is described above with regards to FIG. 3A.

In some implementations, a home appliance (e.g. home appliance 110) may include the local controller 140 including communication device 145 and power sensor 144. In some implementations, a plug of a home appliance (e.g., plug 128) may include the local controller 140 including communication device 145 and power sensor 144. In some implementations, the local controller 140 of the plug 128 may use a secure communication connection to communicate with the secure communication network 103.

In some implementations, a home appliance may include the local controller 140 and the communication device 145 and the plug of the home appliance may include the power sensor 144. In this configuration, the power sensor 144 may provide the power consumption data to the local controller 140. In some implementations, a home appliance may include a plug that itself includes the local controller 140 and the communication device 145. In this configuration, the home appliance may include the power sensor 144 and the power sensor 144 may provide the power consumption data to the local controller 140.

In some implementations, a home appliance may include the local controller 140 including a first communication device 145 and a power sensor 144 and the plug of the home appliance may include a second communication device 145. In some implementations, a receptacle of the home appliance grid 102 may include the controller 140 and may include a communication device 145 and/or a power sensor 144 and may provide the consumption data to the power controller 130.

In some implementations, a home appliance (e.g. home appliance 110) may include a first means for adjusting power consumption and the local controller(s) 140 in the home appliance and/or a plug of the home appliance may provide a second or a third means. In some implementations, a local controller 140 or a communication device 145 may include a unique identification number and the identification number may be used for establishing a secure communication between the local controller 140 and the power controller 130. In an example, the unique identification number can be pre-assigned at a time of manufacture.

Figure 4:
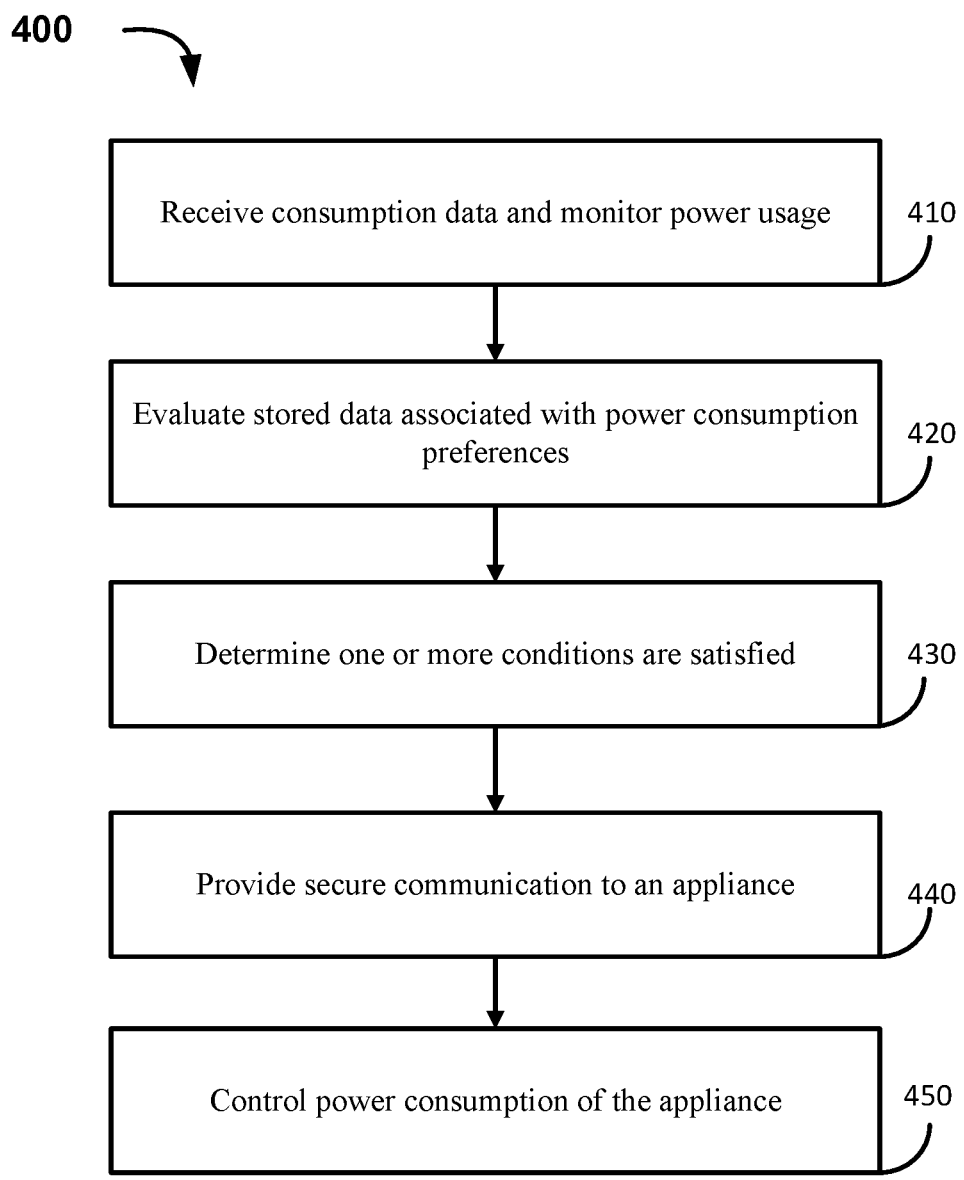
FIG. 4 is a flow diagram of an example method for controlling power consumption of appliances.

Referring to FIG. 4, a flow diagram for a method 400 for controlling the power consumption of a home appliance is shown. As an example, the method 400 can be implemented by the circuit 100 of FIG. 1 and controlling the power consumption can be achieved by the power controller 130 that may be included in the power meter 120. The method includes receiving consumption data and monitoring power usage (410). As an example, the consumption data can be provided by home appliances 104, 106, 108, or 110 through the secure communication network 103 to an example power controller 130. The consumption data can be generated by an example power sensor 144 in a local controller 140 associated with the home appliances. As an example, monitoring the power usage can be performed by a monitoring engine 132 of the power controller 130.

Stored data associated with power consumption preferences is evaluated (420). As an example, the detector 136 may evaluate the power consumption preferences 139 of the stored data 138. The power consumption preferences may define conditions where a consumer associated with the home appliance grid has agreed to enable remote control of at least one of the home appliances upon an occurrence of one or more predetermined condition. As an example, the detector 136 may receive monitored data from the monitoring engine 132 and may determine whether one or more predetermined conditions have been detected in accordance with the power consumption preferences 139.

One or more conditions are determined to be satisfied (430). As an example, the determination that one or more conditions are satisfied can be performed by the detector 136. The detector may identify that predetermined conditions of at least one power consumption preference associated with at least one home appliance and may determine that conditions agreed by a consumer associated with the home appliance are satisfied.

A secure communication is provided to an appliance (440). As an example, the secure communication to home appliances can be provided by a communication module 134 through the secure connection 135 and the secure communication network 103. The secure communication may include a command (e.g., to command the home appliance to change configuration or shut down). Establishing a secure communication is described in greater detail below with respect to FIG. 5A.

Thereafter, the power consumption of the home appliance is controlled (450). As an example, power controller 130 may control the power consumption of a home appliance by providing a command to the home appliance to adjust the power consumption or turn the home appliance off.

Referring to FIG. 5A, a flow diagram for a method 500 for establishing secure communication between the home appliances and the power controller is shown. As an example, the method 500 can be implemented by the circuit 100 of FIG. 1 and a home appliance 104, 106, 108, or 110 may send a request to join the communication network 103. The method includes receiving one or more requests from local controllers of home appliances (510).

As an example, a local controller 140 of one of the home appliances 104, 106, 108, or 110 may send a request and the request may be received by a power controller 130 of the power controller 120. The request by the local controller may include a unique identification number. As an example a local controller 140 may enclose the unique identification number in the request.

Unique encryption codes are assigned and the codes are transferred to local controllers (520). Based on the unique identification number of the local controller, a unique encryption code is assigned to the local controller and the unique encryption code may be transferred to the local controller. As an example, the communication module 134 of the power controller 130 may receive the request from local controller 140 of a home appliance and the communication module 134 or the power controller 130 may generate a unique encryption code for each local controller based on the unique identification number provided by the local controller 140.

The appliances communicate using the assigned encryption codes (530). Each local controller is assigned a unique encryption code and the communications between local controllers and the power controller is secured using the encryption code. As an example, each local controller 140 may use the assigned unique encryption code for communicating with the power controller 130 including sending data and/or receiving data or commands that are encrypted using the assigned code.

Commanding the appliances can include turning off or adjusting power to a respective appliance (540). As an example, the power controller 130 may control a home appliance by sending a power off command to the local controller 140 of the home appliance using the unique encryption code associated with the local controller 140 and through the secure communication network 103.

In some implementations, the local controller 140 may acquire the unique encryption code only once when the home appliance joins the secure communication network 103 for the first time and may use the unique encryption code any time the home appliance coupled to the same secure communication network 103 turns on. In some implementations, the local controller 140 may acquire the unique encryption code every time the home appliance turns on. In yet other examples, the encryption code can be pre-assigned at a time of manufacture.

Referring to FIG. 5B, a flow diagram for a method 550 for responding to a fault and/or anomaly of the home appliances is shown. As an example, the method 550 can be implemented by the circuit 100 of FIG. 1 and the home appliance 104, 106, 108, or 110 may be turned off if a fault or anomaly occurs.

A power signature of an appliance is monitored (560). The power signature of a home appliance may be defined in accordance with power consumption history of an appliance in a span of time, e.g., a day or a week. As an example, a power controller 130 may monitor the power consumption of the home appliances coupled to the power controller 130 and may create daily and/or weekly signatures for the home appliances. Running averages may be used for updating the power signatures. The power signatures may include limitations on maximum current or power consumption.

A fault or an anomaly is detected (570). In some implementations, an anomaly is detected when the power consumption of a home appliance significantly deviates from the power signature. As an example, the power controller 130 monitoring a home appliance 104, 106, 108, or 110 may determine that the daily power consumption of one of 104, 106, 108, or 110 has increased by several folds and may identify an anomaly.

In some implementations, faults are detected based on instantaneous power or current consumption of a home appliance. As an example, the power controller 130 monitoring a home appliance 104, 106, 108, or 110 may determine that the instantaneous power or current consumption of one of 104, 106, 108, or 110 has increased by several folds and may detect a fault.

After fault detection, a secure communication is provided to the appliance (580). The secure communication may be provided using the unique encryption code of a respective home appliance. As an example, the power controller 130 may use the assigned unique encryption code for securely communicating to a given local controller 140 of respective home appliance including receiving data and/or sending data or commands.

The appliance is turned off or otherwise controlled (590). Controlling a home appliance may performed by using the unique encryption code of the respective local controller. As an example, the power controller 130 may control a home appliance by sending a command to the local controller 140 of the home appliance using a unique encryption code and communicating through the secure communication network 103.

As described above, one or more appliances can be coupled to a power controller using a secure communication protocol. Individual appliances can be added to a system (i.e., controlled by power controller) over time. For example, an initial system can include a first set of appliances that are controlled by a power controller (such as power controller 130). One or more additional appliances may be added to the system, either as new devices to be controlled or to replace an existing one of the appliances in the first set. In some implementations, the introduction of a new appliance can be automatic and support plug and play operation. For example, an appliance can include a local controller (e.g., local controller 140) that is configured at power up (e.g., plug in) to establish a secure communication link with a power controller associated with a given location where the appliance is installed. One example method includes plugging an appliance into a power grid at a location, and, after plugging in, automatically configuring the appliance to communicate with a power controller. Automatically configuring can include establishing a secure communication link with the power controller over lines used to power the appliance or over airwaves using a wireless communication link. For example, the local controller 140 can communicate over the power lines to power controller 130, or over a wireless link. The communication can be made secure, such as by using security codes as described above. The method can further include receiving a command from the power controller over the secure communication link to change an operation mode or a power configuration of the appliance in response to an occurrence of a predetermined set of conditions that relate to power consumption of the appliance. For example, the power controller 130 can monitor the power consumption of the appliance and, based on the stored preferences, determine that the appliance should be controlled/re-configured. The method can further include receiving a command at the local controller and changing the operation mode or power configuration of the appliance in response to the received command.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
receiving, at a power controller, one or more requests from a plurality of electrical appliances at a first location to join a network of appliances, the one or more requests including unique identification numbers corresponding to the plurality of electrical appliances;

in response to receiving the one or more requests including the unique identification numbers, assigning, by the power controller, encryption codes to the appliances, wherein assigning encryption codes to the appliances comprises generating, by the power controller for each appliance, an encryption code corresponding to the unique identification number of the respective appliance;

communicating with one or more appliances using respective encryption codes;

receiving, at the power controller, consumption data from a first electrical appliance of the plurality of electrical appliances;

evaluating, by the power controller, the received consumption data;

and in response to evaluating the received consumption data, transmitting a first secure communication from the power controller to the first electrical appliance with instructions to control power consumption, wherein the first secure communication is encrypted using an encryption code assigned to the first electrical appliance.

2. The method of claim 1, wherein evaluating the received consumption data comprises:

obtaining stored data related to power consumption preferences of the first electrical appliance, the power consumption preferences including different states of operation of the first electrical appliance and preselected conditions that trigger remote control of the first electrical appliance; and comparing the received consumption data with the stored data related to the power consumption preferences of the first electrical appliance.

3. The method of claim 2, wherein the preselected conditions includes one or more of threshold power consumption values of the first electrical appliance corresponding to the different states of operation of the first electrical appliance, or one or more time periods at which remote control of the first electrical appliance is authorized.

4. The method of claim 2, further comprising:

in response to the comparison, determining that one or more of the preselected conditions are satisfied for the first electrical appliance; and in response to the determination, transmitting, with the first secure communication, a command to perform at least one of turning off the first electrical appliance, or adjusting a power usage of the first electrical appliance.

5. The method of claim 2, further comprising:

receiving, from a user associated with the first location, specifications for the preselected conditions.

6. The method of claim 1, wherein the consumption data includes one or more of an input voltage of AC power to the first electrical appliance, a current drawn by the first electrical appliance, a power used by the first electrical appliance, a power factor associated with the first electrical appliance, an integral power for the first electrical appliance, or a power state of the first electrical appliance.

7. The method of claim 1, wherein receiving the consumption data includes receiving the consumption data through a power grid associated with the first location.

8. The method of claim 1, wherein receiving the consumption data includes receiving the consumption data through the network of appliances, the network coupling the plurality of electrical appliances at the first location to the power controller.

9. The method of claim 1, wherein evaluating the received consumption data comprises detecting an anomaly in a power signature of the first electrical appliance and, and wherein transmitting the first secure communication includes providing a command to turn off the first electrical appliance in response to detecting the anomaly.

10. The method of claim 1, wherein evaluating the received consumption data comprises detecting a fault in the first electrical appliance, and wherein transmitting the first secure communication includes providing a command to turn off the first electrical appliance in response to detecting the fault.

11. The method of claim 1, further comprising:

providing a second secure communication to one or more authorized users using a second network, wherein the authorized users receive the consumption data and send commands to control power consumption.

12. An apparatus, comprising:

functionality to perform power control operations, the power control operations comprising:

receiving one or more requests from a plurality of electrical appliances at a first location to join a network of appliances, the one or more requests including unique identification numbers corresponding to the plurality of electrical appliances;

in response to receiving the one or more requests including the unique identification numbers, assigning encryption codes to the appliances, wherein assigning encryption codes to the appliances comprises generating, by the power controller for each appliance, an encryption code corresponding to the unique identification number of the respective appliance;

communicating with one or more appliances using respective encryption codes;

receiving consumption data from a first electrical appliance of the plurality of electrical appliances;

evaluating the received consumption data; and in response to evaluating the received consumption data, transmitting a first secure communication to the first electrical appliance with instructions to control power consumption, wherein the first secure communication is encrypted using an encryption code assigned to the first electrical appliance.

13. The apparatus of claim 12, wherein evaluating the received consumption data comprises:

obtaining stored data related to power consumption preferences of the first electrical appliance, the power consumption preferences including different states of operation of the first electrical appliance and preselected conditions that trigger remote control of the first electrical appliance; and comparing the received consumption data with the stored data related to the power consumption preferences of the first electrical appliance.

14. The apparatus of claim 13, wherein the preselected conditions include one or more of threshold power consumption values of the first electrical appliance corresponding to the different states of operation of the first electrical appliance, or one or more time periods at which remote control of the first electrical appliance is authorized.

15. The apparatus of claim 13, wherein the power control operations further comprise:

in response to the comparison, determining that one or more of the preselected conditions are satisfied for the first electrical appliance; and in response to the determination, transmitting, with the first secure communication, a command to perform at least one of turning off the first electrical appliance, or adjusting a power usage of the first electrical appliance.

16. The apparatus of claim 13, wherein the power control operations further comprise:

receiving, from a user associated with the first location, specifications for the preselected conditions.

17. The apparatus of claim 12, wherein the consumption data includes one or more of an input voltage of AC power to the first electrical appliance, a current drawn by the first electrical appliance, a power used by the first electrical appliance, a power factor associated with the first electrical appliance, an integral power for the first electrical appliance, or a power state of the first electrical appliance.

18. The apparatus of claim 12, wherein receiving the consumption data includes receiving the consumption data through a power grid associated with the first location.

19. The apparatus of claim 12, wherein receiving the consumption data includes receiving the consumption data through the network of appliances, the network coupling the plurality of electrical appliances at the first location to the power controller.

20. The apparatus of claim 12, wherein evaluating the received consumption data comprises detecting an anomaly in a power signature of the first electrical appliance and, and wherein transmitting the first secure communication includes providing a command to turn off the first electrical appliance in response to detecting the anomaly.

21. The apparatus of claim 12, wherein evaluating the received consumption data comprises detecting a fault in the first electrical appliance, and wherein transmitting the first secure communication includes providing a command to turn off the first electrical appliance in response to detecting the fault.

22. The apparatus of claim 12, wherein the power control operations further comprise:

providing a second secure communication to one or more authorized users using a second network, wherein the authorized users receive the consumption data and send commands to control power consumption.

* * * * *

UNITED STATES PATENT AND TRADEMARK OFFICE
CERTIFICATE OF CORRECTION

PATENT NO. : 10,567,853 B2
APPLICATION NO. : 15/881178
DATED : February 18, 2020
INVENTOR(S) : Jeff Kotowski and Charles Cai It is certified that error appears in the above-identified patent and that said Letters Patent is hereby corrected as shown below:

On the Title Page

Item (73) (Assignee), Line 1, Delete "Amtel" and insert -- Atmel --;

In the Drawings

Sheet 2 of 5 (Reference Numeral 139) (FIG. 2), Line 1, Delete "prefernces" and insert
-- preferences --;

In the Claims

Column 12, Line 3, In Claim 9, delete "appliance and, and" and insert -- appliance, and --; and Column 14, Line 3, In Claim 20, delete "appliance and, and" and insert -- appliance, and --.

Signed and Sealed this
Third Day of September, 2024

Katherine Kelly Vidal
*Director of the United States Patent and Trademark Office*